(12) United States Patent
Kim et al.

(10) Patent No.: US 9,061,914 B2
(45) Date of Patent: Jun. 23, 2015

(54) CATALYST FOR RECOVERING LIGHT OIL AND PREPARATION METHOD THEREOF

(75) Inventors: Moon Chan Kim, Seoul (KR); Byeong Woo Kim, Gangneung-si (KR)

(73) Assignee: EPEL CO., LTD (KR)

( * ) Notice: Subject to any disclaimer, the term of this patent is extended or adjusted under 35 U.S.C. 154(b) by 559 days.

(21) Appl. No.: 12/753,277

(22) Filed: Apr. 2, 2010

(65) Prior Publication Data
US 2011/0039687 A1    Feb. 17, 2011

(30) Foreign Application Priority Data

Aug. 17, 2009  (KR) .................. 10-2009-0075516

(51) Int. Cl.
| | |
|---|---|
| *B01J 29/06* | (2006.01) |
| *C01B 39/02* | (2006.01) |
| *B01J 29/80* | (2006.01) |
| *B01J 29/78* | (2006.01) |
| *B01J 29/076* | (2006.01) |
| *B01J 23/889* | (2006.01) |
| *B01J 29/00* | (2006.01) |
| *B01J 29/035* | (2006.01) |
| *B01J 29/04* | (2006.01) |
| *B01J 37/03* | (2006.01) |
| *C10L 1/02* | (2006.01) |
| *C10G 3/00* | (2006.01) |

(52) U.S. Cl.
CPC .......... *C01B 39/026* (2013.01); *B01J 2029/062* (2013.01); *B01J 29/061* (2013.01); *B01J 29/80* (2013.01); *B01J 29/78* (2013.01); *B01J 29/076* (2013.01); *B01J 23/8892* (2013.01); *B01J 29/005* (2013.01); *B01J 29/0358* (2013.01); *B01J 29/04* (2013.01); *B01J 37/033* (2013.01); *B01J 37/036* (2013.01); *C10G 2300/1011* (2013.01); *C10L 1/026* (2013.01); *Y02E 50/13* (2013.01); *C10G 3/49* (2013.01); *C10G 2300/1003* (2013.01)

(58) Field of Classification Search
USPC .................. 502/60, 63, 64, 67, 322, 323, 324
See application file for complete search history.

(56) References Cited

U.S. PATENT DOCUMENTS

| | | |
|---|---|---|
| 3,966,883 A | 6/1976 | Vaughan et al. |
| 4,017,590 A | 4/1977 | Cormier et al. |
| 4,088,739 A | 5/1978 | Vaughan et al. |

FOREIGN PATENT DOCUMENTS

| | | |
|---|---|---|
| KR | 10-0330929 | 7/2000 |
| KR | 10-0297321 | 9/2000 |
| KR | 10-0322663 | 10/2001 |
| KR | 10-0335657 | 11/2001 |
| KR | 10-0350776 | 1/2002 |
| KR | 10-0474965 | 8/2003 |
| KR | 10-0656177 | 8/2006 |
| KR | 10-0801539 | 5/2007 |

*Primary Examiner* — Elizabeth Wood
(74) *Attorney, Agent, or Firm* — Cantor Colburn LLP

(57) ABSTRACT

Disclosed herein are a novel catalyst for recovering good-quality light oil from materials such as woody hydrocarbons, woody plastics and waste oils, and a preparation method thereof. The catalyst has a three-dimensional network structure and a cubic crystal structure sharing oxygen atoms, and has a Si/Al ratio greater than 1, and includes an alkali metal, an alkaline earth metal and a water molecule of crystallization. The catalyst enables good-quality light oil to be recovered from waste plastics, woody hydrocarbons and waste oils and is highly advantageous in terms of environmental problems.

1 Claim, 2 Drawing Sheets

CATALYST FOR RECOVERING LIGHT OIL AND PREPARATION METHOD THEREOF

CROSS-REFERENCE TO RELATED APPLICATIONS

This application claims priority to Korean Patent Application No. 10-2009-0075516, filed on Aug. 17, 2009, and all the benefits accruing therefrom under 35 U.S.C. §119, the contents of which in its entirety are herein incorporated by reference.

BACKGROUND OF THE INVENTION

1. Field of the Invention

The present invention relates to a catalyst, and more particularly to a novel catalyst for recovering high-quality light oil from materials to be treated, such as woody hydrocarbons, waste plastics and waste oils, and a preparation method thereof.

2. Background of the Related Art

In the field for the production of new renewable energy, technologies for producing energy using bio-mass, which are now in practical use, include a technology of producing bio-ethanol using starch crops such as maize and cassava, a technology for producing bio-diesel from oil and fat plants such as rape, or vegetable fats, a method of either burning woody materials to produce heat or making wood chips for use as fuel for cogeneration from woody material, a technology for processing waste to produce RDF or RPF, a technology for thermally decomposing woody and waste at high temperatures to produce synthetic oil, a technology for either filtering or heating, distilling and purifying waste oil to produce lower fuel, and a technology of using biogas (e.g., LDF gas) directly as an energy source to generate power, treat city sewage, treat distillery waste or produce methane gas in livestock wastewater treatment plants. Recently, technologies for using woody biomass to produce bio-butanol and the like have been attempted.

Technologies for producing liquid fuel from non-edible biomass, which are evaluated as future technologies, include a technology for producing bio-ethanol by microbial decomposition, and a technology for producing bio-butane fuel or lower synthetic fuel which can be used in a mixture with gasoline after gasification. EVK (Germany) developed a technology of producing diesel oil directly from waste using a zeoilte catalyst.

The above-mentioned three types of methods have respective technological features, and fuels produced thereby have many differences in their characteristics and quality.

The above-mentioned types and levels of technology have limitations either due to the use of imported expensive eatable crops as raw materials or due to the use of old technology and the absence of breakthrough catalyst technology, even though various methods are being attempt to overcome such limitations. Thus, there is an urgent need to develop breakthrough technologies, including catalysts and processes which can be used in decomposing cellulosic non-edible biomass such as plants, woods and agricultural byproducts.

In regard to catalysts for cracking waste plastics, Korean Patent No. 0330929 discloses a catalyst for decomposing waste plastics, which is obtained by ion-exchanging clinoptilolite-type zeolite with hydrogen, and a method for decomposing waste plastics using the catalyst. Also, Korean Patent No. 0322663 discloses a method of catalytically cracking waste plastics in a fluidized bed by carrying out a dehydrogenation reaction in contact with a nickel or nickel alloy catalyst while introducing an aluminosilicate based solid acid catalyst.

Meanwhile, methods for synthesizing zeolites from various raw materials are disclosed in Korean Patent Nos. 0350776, 0297321, 0335657, 0656177, 0474965 and 0801539. In addition, various methods for hydrothermal synthesis of zeolites are disclosed in U.S. Pat. Nos. 3,966,883, 4,088,739 and 4,017,590.

However, these zeolites do not make it easy to recover good-quality light oil from materials to be treated, such as waste plastics, woody hydrocarbons and waste oils.

SUMMARY OF THE INVENTION

Therefore, it is an object of the present invention to provide a catalyst for recovering good-quality light oil from materials, such as waste plastics, woody hydrocarbons and waste oils, which are currently generated in large quantities, are difficult and expensive to treat, and cause damage to the environment.

To achieve the above object, in one aspect, the present invention provides a crystalline zeolite catalyst for recovering light oil, which has a three-dimensional network structure and a cubic crystal structure sharing oxygen atoms, has a Si/Al ratio greater than 1, includes a water molecule of crystallization, and comprises a mixture of manganese aluminosilicate ($Mn_2Al_4Si_5O_{18}$) and sodium manganese aluminosilicate ($Na_6MnAl_4Si_8O_{26}$) or a mixture of manganese aluminosilicate ($Mn_2Al_4Si_5O_{18}$) and hydrogen manganese aluminosilicate ($H_6MnAl_4Si_8O_{26}$).

In another aspect, the present invention provides a method of preparing a crystalline zeolite catalyst of the mixture of manganese aluminosilicate ($Mn_2Al_4Si_5O_{18}$) and sodium manganese aluminosilicate ($Na_6MnAl_4Si_8O_{26}$) of the present invention, the method comprising the steps of: introducing a sodium silicate solution and sodium aluminate ($NaAlO_2$) at a molar ratio of 1:1 to 20:1 into a reactor; adding thereto manganese nitrate in an amount of 1-20 wt % based on the weight of the sodium aluminate, sodium hydroxide in an amount twice the weight of the sodium aluminate, water in an amount 10-25 times the weight of the sodium aluminate, and hydrochloric acid in an amount of 1-10 wt % based on the weight of the sodium hydroxide; stirring the mixture at room temperature at a speed of more than 300 rpm; and subjecting the stirred mixture to hydrothermal synthesis in an autoclave at a temperature ranging from 80° C. to 300° C. for 6-160 hours.

Either the inventive crystalline zeolite catalyst comprising a mixture of manganese aluminosilicate ($Mn_2Al_4Si_5O_{18}$) and sodium manganese aluminosilicate ($Na_6MnAl_4Si_8O_{26}$) or the inventive crystalline zeolite catalyst comprising a mixture manganese aluminosilicate ($Mn_2Al_4Si_5O_{18}$) and sodium manganese aluminosilicate ($H_6MnAl_4Si_8O_{26}$) enables good-quality light oil to be recovered from materials, such as waste plastics, woody hydrocarbons and waste oils, and thus is also highly advantageous in terms of environmental issues.

DETAILED DESCRIPTION OF THE PREFERRED EMBODIMENT

Figure 1:
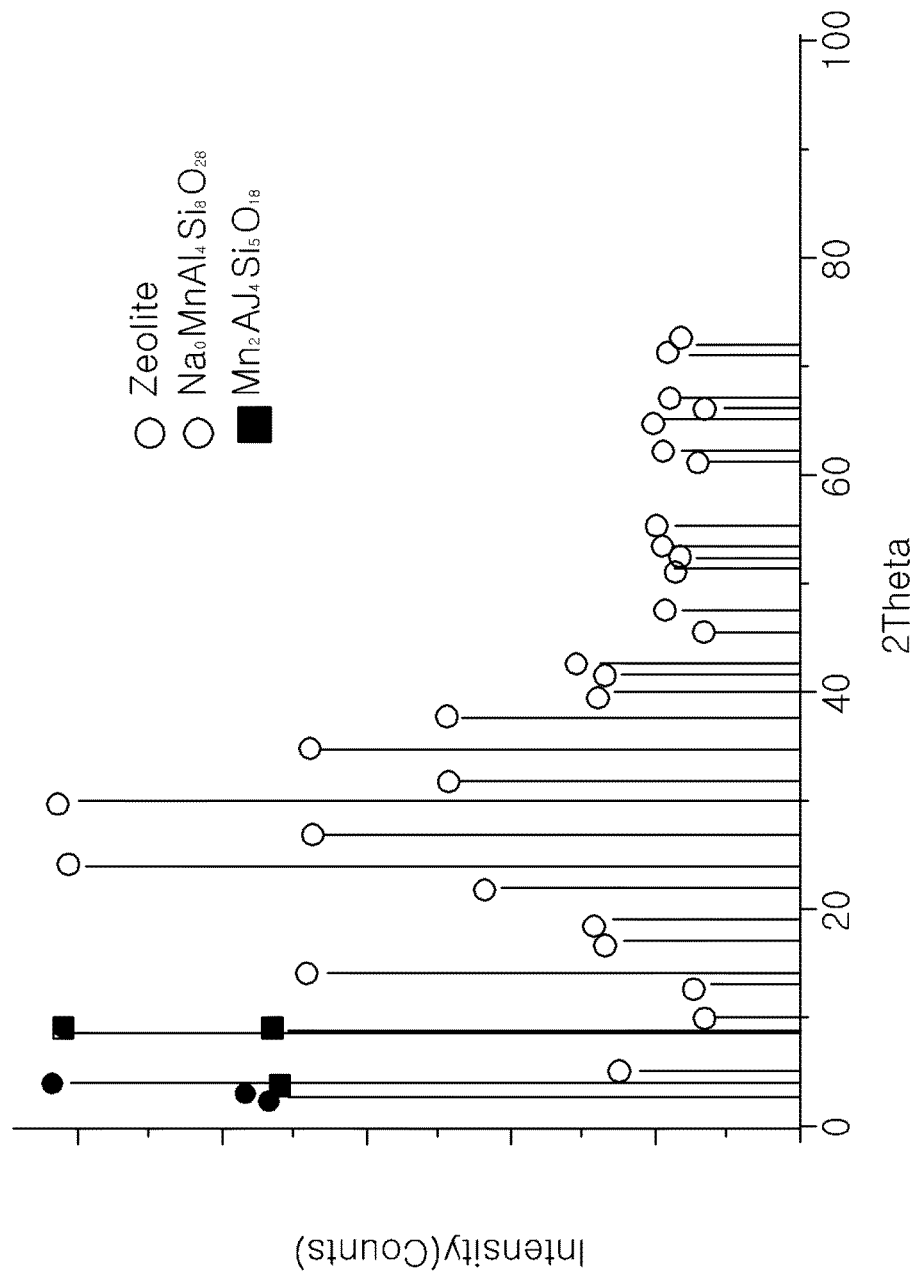
FIG. 1 is a graphic diagram showing the results of X-ray diffraction analysis of the catalyst prepared according to the method of the present invention (manganese aluminosilicate ($Mn_2Al_4Si_5O_{18}$) peak: $2\theta=8.65, 8.77, 3.40$; sodium manganese aluminosilicate ($Na_6MnAl_4Si_8O_{26}$) peak: $2\theta=3.99, 3.56, 2.67$). From this X-ray diffraction graph, it can be seen that the catalyst prepared according to the method of the present invention is a crystalline zeolite catalyst composed of a mixture of manganese aluminosilicate ($Mn_2Al_4Si_5O_{18}$) and sodium manganese aluminosilicate ($Na_6MnAl_4Si_8O_{26}$).

Hereinafter, the present invention will be described in detail.

Examples of the alkali metal which can be used in the present invention include Na and K, and examples of the alkaline earth metal which can be used in the present invention include Ca and Mg.

If the molar ratio of the sodium silicate solution and the sodium aluminate ($NaAlO_2$) is lower than 1:1, crystal formation will be difficult, and if the molar ratio is higher than 20:1, crystal formation will also be difficult, and furthermore, the Si/Al ratio in the catalyst will be increased, and thus when catalytic cracking waste plastics and woody hydrocarbons, materials having a boiling point lower than that of light oil will be produced in large amounts.

If the manganese nitrate is added in an amount smaller than 1 wt % based on the weight of the sodium aluminate, a crystal composed of a mixture of manganese aluminosilicate ($Mn_2Al_4Si_5O_{18}$) and sodium manganese aluminosilicate ($Na_6MnAl_4Si_8O_{26}$) will not be produced, and if the manganese nitrate is added in an amount larger than 20 wt % based on the weight of the sodium aluminate, excess manganese will interfere with crystal production.

Sodium hydroxide is added in an amount twice the weight of the sodium aluminate. If the amount of sodium hydroxide added deviates from this weight ratio, crystal formation will become slower, and high temperature and pressure will be required. Furthermore, water is added in an amount 10-25 times the weight of the sodium aluminate. If the amount of water added deviates from this range, crystal growth will be influenced. Moreover, hydrochloric acid is added in an amount of 1-10 wt % based on the weight of the sodium hydroxide. If the hydrochloric acid is added in an amount of less than 1 wt % based on the weight of the sodium hydroxide, only a sodium manganese aluminosilicate ($Na_6MnAl_4Si_8O_{26}$) crystal will be produced and a manganese aluminosilicate crystal will not substantially be produced. Thus, in this case, an increase in catalytic cracking efficiency resulting from the synergistic effect of the two types of crystals will not be obtained. On the other hand, if the hydrochloric acid is added in an amount of more than 10 wt % based on the weight of the sodium hydroxide, crystal production will become slower, only the manganese aluminosilicate ($Mn_2Al_4Si_5O_{18}$) crystal will be produced and the sodium manganese aluminosilicate ($Na_6MnAl_4Si_8O_{26}$) crystal will not substantially be produced. Thus, in this case, the synergistic effect of the two types of crystals will not be obtained, leading to a decrease in catalytic cracking efficiency.

The crystal comprising a mixture of manganese aluminosilicate ($Mn_2Al_4Si_5O_{18}$) and sodium manganese aluminosilicate ($Na_6MnAl_4Si_8O_{26}$) is synthesized by hydrothermal synthesis in an autoclave at a temperature ranging from 80° C. to 300° C. for 6-160 hours. If the temperature in this hydrothermal synthesis process is lower than 80° C., crystal growth will not occur, and if the temperature is higher than 300° C., the crystal morphology will be changed, such that the desired crystal will not be obtained. Moreover, if the hydrothermal synthesis time is shorter than 6 hours, crystallinity will be significantly decreased, and if it is longer than 160 hours, a further increase in crystallinity will not be obtained. The sodium manganese aluminosilicate ($Na_6MnAl_4Si_8O_{26}$) in the crystalline zeolite catalyst comprising the mixture of manganese aluminosilicate ($Mn_2Al_4Si_5O_{18}$) and sodium manganese aluminosilicate ($Na_6MnAl_4Si_8O_{26}$) can be ion-exchanged to form an ion-exchanged $H_6MnAl_4Si_8O_{26}$ structure. In this case, the catalyst of the invention is a zeolite catalyst having a crystal structure comprising a mixture of manganese aluminosilicate ($Mn_2Al_4Si_5O_{18}$) and hydrogen manganese aluminosilicate ($H_6MnAl_4Si_8O_{26}$).

Herein, the ion exchange is performed by ion-exchanging the crystalline zeolite catalyst (comprising a mixture of manganese aluminosilicate ($Mn_2Al_4Si_5O_{18}$) and sodium manganese aluminosilicate ($Na_6MnAl_4Si_8O_{26}$)) with $NH_4Cl$ or $HCl$ solution. After synthesis, the zeolite catalyst is preferably dried at a temperature ranging from 100° C. to 150° C. for at least 6 hours. After drying, the zeolite catalyst is preferably calcined at a temperature ranging from 300° C. to 600° C. for at least 2 hours in an air atmosphere.

The crystalline zeolite catalyst comprising the mixture of manganese aluminosilicate ($Mn_2Al_4Si_5O_{18}$) and sodium manganese aluminosilicate ($Na_6MnAl_4Si_8O_{26}$), which is prepared according to the present invention, has a reaction temperature lower than that of a conventional zeolite catalyst, leading to high energy efficiency. Also, it shows a high selectivity to light oil fraction, thus enabling a good-quality light oil product to be obtained.

The catalyst prepared as described above is added to a raw material, obtained by finely crushing a mixture of woody hydrocarbons, waste plastics, waste oils and the like, in an amount of 0.1-20 wt % based on the weight of the mixture. The raw material together with the catalyst is stirred in a fluidized-bed reactor at a temperature ranging from 200° C. to 400° C. The liquid phase material and vapor phase material produced by stirring are condensed to obtain light oil. The obtained light oil may be passed through a distillation column to increase the purity thereof. If the amount of catalyst added is smaller than 0.1 wt % based on the weight of the raw material, a reaction will not easily occur, and if it is in excess of 20 wt %, it will increase ash to adversely affect the reaction and will be cost-ineffective.

In the present invention, the crystalline zeolite catalyst comprising the mixture of manganese aluminosilicate ($Mn_2Al_4Si_5O_{18}$) and sodium manganese aluminosilicate ($Na_6MnAl_4Si_8O_{26}$) is used to crack at least one selected from among polyethylene, polypropylene, polystyrene, polyester, ABS resin, polyurethane and the like, which are waste plastics, and to crack at least one selected from among canola oil sludge, palm oil sludge, jatropha oil sludge and the like, which are woody hydrocarbons. When the catalyst and the raw material consisting of waste plastics and woody hydrocarbons are placed in a reactor and allowed to react with stirring at a temperature ranging from 280° C. to 400° C. for a period of time ranging from 1 minute to 2 hours, a $C_{12}$-$C_{23}$ liquid product corresponding to light oil will be obtained as a main product, a $C_5$-$C_{11}$ volatile oil product will be obtained as a minor product, and a $C_1$-$C_4$ gaseous product can also be obtained.

Waste plastics, woody hydrocarbons and waste oils which can be used in the present invention are not limited only to the above-mentioned materials and include all materials which are included in the definition thereof.

Hereinafter, the present invention will be described in further detail with reference to non-limiting examples.

EXAMPLES

Example 1

Figure 2:
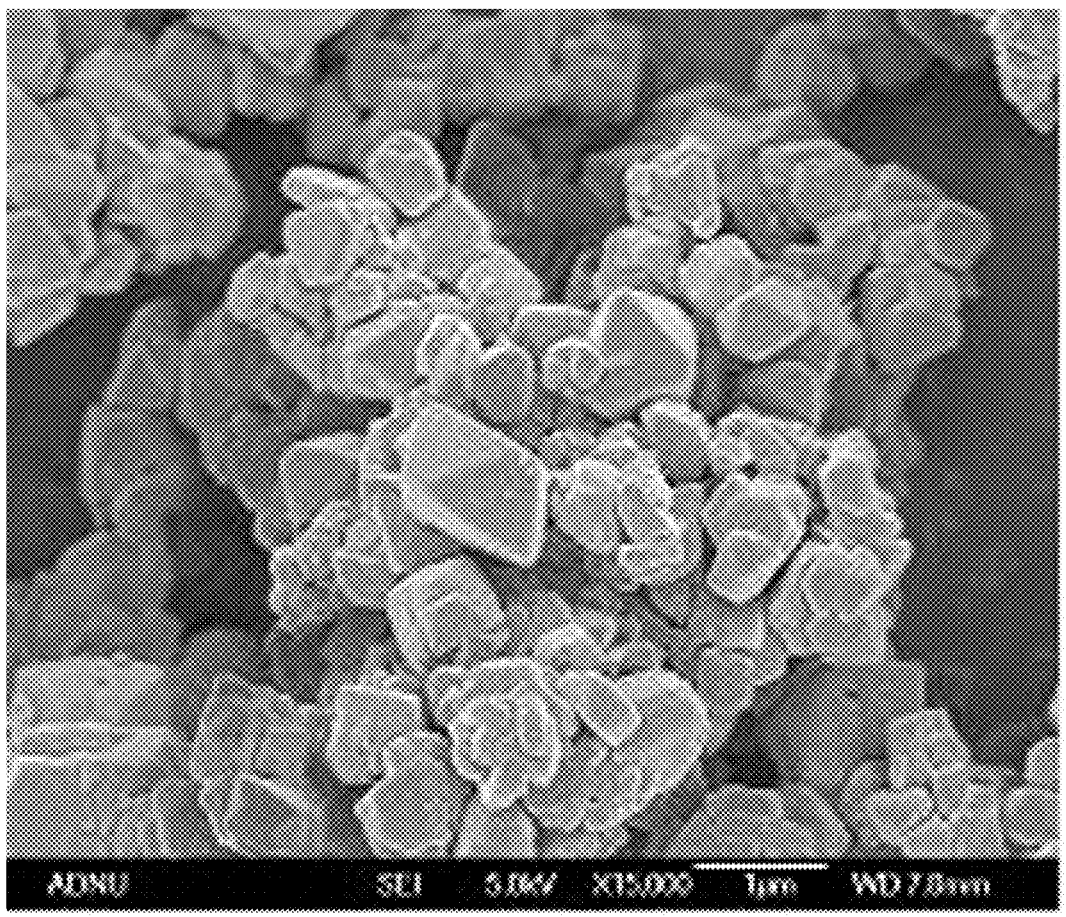
FIG. 2 is a micrograph of the catalyst prepared according to the method of the present invention. This photograph indicates that the catalyst prepared according to the method of the present invention has a cubic system crystal structure.

2 g of sodium aluminate, 5 g of sodium silicate, 4 g of sodium hydroxide and 0.2 g of hydrochloric acid were added to 400 g of water, and 0.1 g of manganese nitrate was added thereto. Then, the mixture was stirred at a speed of 2,000 rpm for 3 hours. Then, the reaction solution was placed in a Teflon reactor which was, in turn, completely sealed. Then, the reactor was placed in an autoclave and subjected to hydrothermal synthesis at 95° C. for hours. Subsequently, the product was separated by centrifugation, and then dried at 120° C. for 12 hours, thus preparing a crystalline zeolite catalyst comprising a mixture of manganese aluminosilicate ($Mn_2Al_4Si_5O_{18}$) and sodium manganese aluminosilicate ($NaMnAl_4Si_8O_{26}$). The results of X-ray diffraction analysis of the obtained catalyst are shown in FIG. 1, and the crystal morphology of the obtained catalyst is shown in an SEM photograph of FIG. 2.

Example 2

2 g of calcium aluminate, 5 g of sodium silicate, 4 g of calcium hydroxide and 0.2 g of hydrochloric acid were added to 400 g of water, and 0.1 g of manganese nitrate was added thereto. Then, the mixture was stirred at a speed of 2,000 rpm for 3 hours. Then, the reaction solution was placed in a Teflon reactor which was, in turn, completely sealed. Then, the reactor was placed in an autoclave and subjected to hydrothermal synthesis at 95° C. for hours. Subsequently, the product was separated by centrifugation, and then dried at 120° C. for 12 hours, thus preparing a crystalline zeolite catalyst comprising a mixture of manganese aluminosilicate ($Mn_2Al_4Si_5O_{18}$) and calcium manganese aluminosilicate ($Ca_3MnAl_4Si_8O_{26}$).

Example 3

2 g of sodium aluminate, 5 g of calcium silicate, 4 g of sodium hydroxide and 0.2 g of hydrochloric acid were added to 400 g of water and stirred at a speed of 2,000 rpm for 3 hours. Then, the reaction solution was placed in a Teflon reactor which was, in turn, completely sealed. Then, the reactor was placed in an autoclave and subjected to hydrothermal synthesis at 95° C. for hours. Subsequently, the product together with 0.1 g of manganese nitrate and 1 g of 0.1 M hydrochloric acid aqueous solution was placed in a rotary evaporator and subjected to ion exchange at 500 rpm at 90° C. for 12 hours. Next, the product was dried at 120° C. for 12 hours, and then calcined at 500° C. for 2 hours, thus preparing a crystalline zeolite catalyst comprising a mixture of manganese aluminosilicate ($Mn_2Al_4Si_5O_{18}$) and hydrogen manganese aluminosilicate ($H_6MnAl_4Si_8O_{26}$).

Example 4

3 g of polypropylene, 3 g of polyethylene, 3 g of polyester, 3 g of ABS resin and 3 g of polystyrene were mixed with 0.5 g of a crystalline zeolite catalyst comprising a mixture of manganese aluminosilicate ($Mn_2Al_4Si_5O_{18}$) and sodium manganese aluminosilicate ($Na_6MnAl_4Si_8O_{26}$), and the resulting material was introduced into a 1-liter reactor. Then, the reaction material was stirred at different temperatures of 280° C., 340° C. and 400° C. at a speed of 500 rpm for 60 minutes. The products were analyzed, and the analysis results are shown in Table 1 below.

TABLE 1

Distribution of products resulting from cracking reaction of mixed plastic

| Temperature (° C.) | Distribution of Products by phase (wt %) | | | Distribution of Liquid-phase Products (wt %) | | |
|---|---|---|---|---|---|---|
| | Vapor-phase | Liquid-phase | Residue | $C_5$-$C_{11}$ | $C_{12}$-$C_{23}$ | More than $C_{23}$ |
| 280 | 19.0 | 56.3 | 24.7 | 18.3 | 49.7 | 42.0 |
| 340 | 23.1 | 76.9 | 0.0 | 21.5 | 59.9 | 18.6 |
| 400 | 25.6 | 74.4 | 0.0 | 26.9 | 65.7 | 7.4 |

As can be seen in Table 1, as the temperature was increased, the residue was decreased, the vapor-phase and liquid-phase products were increased, and the selectivity to the $C_{12}$-$C_{23}$ light oil fraction among these liquid-phase products was increased. Such results indicate that the catalyst of the present invention greatly increased the yield of light oil.

Meanwhile, when general zeolite catalysts are used, it is impossible to obtain good-quality light oil in a high yield, because, at a temperature higher than 400° C., vapor-phase components are predominant, and much residue is present.

Example 5

5 g of canola oil sludge, 5 g of palm oil sludge and 5 g of jatropha oil sludge were mixed with 0.5 g of a crystalline zeolite catalyst comprising a mixture of manganese aluminosilicate ($Mn_2Al_4Si_5O_{18}$) and sodium manganese aluminosilicate ($Na_6MnAl_4Si_8O_{26}$), and the resulting material was introduced into a 1-liter reactor. Then, the reaction material was stirred at different temperatures of 280° C., 340° C. and 400° C. at a speed of 500 rpm for 60 minutes. The products were analyzed, and the analysis results are shown in Table 2 below.

TABLE 2

Distribution of products resulting from cracking reaction of mixed woody hydrocarbon

| Temperature (° C.) | Distribution of Products by phase (wt %) | | | Distribution of Liquid-phase Products (wt %) | | |
|---|---|---|---|---|---|---|
| | Vapor-phase | Liquid-phase | Residue | $C_5$-$C_{11}$ | $C_{12}$-$C_{23}$ | More than $C_{23}$ |
| 280 | 1.4 | 21.6 | 76.8 | 8.1 | 26.3 | 65.6 |
| 340 | 12.5 | 44.4 | 43.1 | 11.4 | 49.8 | 38.8 |
| 400 | 18.2 | 81.8 | 0.0 | 23.3 | 59.7 | 17.0 |

As can be seen in Table 2, as the temperature was increased, the residue was decreased, the vapor-phase and liquid-phase products were increased, and the selectivity to the $C_{12}$-$C_{23}$ light oil fraction among these liquid-phase products was increased. Such results indicate that the catalyst prepared according to the method of the present invention greatly increased the yield of light oil.

Example 6

5 g of canola oil sludge, 5 g of palm oil sludge, 5 g of Jatropha oil sludge, 3 g of polypropylene, 3 g of polyethylene, 3 g of polyester, 3 g of ABS resin, 3 g of polystyrene and 3 g of engine oil were mixed with 1 g of a crystalline zeolite catalyst comprising a mixture of manganese aluminosilicate ($Mn_2Al_4Si_5O_{18}$) and hydrogen manganese aluminosilicate ($H_6MnAl_4Si_8O_{26}$), and the resulting material was introduced into a 1-liter reactor. Then, the reaction material was stirred at different temperatures of 280° C., 340° C. and 400° C. at a speed of 500 rpm for 60 minutes. The products were analyzed, and the analysis results are shown in Table 3 below.

TABLE 3

Distribution of products resulting from cracking reaction of mixture of mixed plastic and mixed woody hydrocarbon

| Temperature (° C.) | Distribution of Products by phase (wt %) | | | Distribution of Liquid-phase Products (wt %) | | |
|---|---|---|---|---|---|---|
| | Vapor-phase | Liquid-phase | Residue | $C_5$-$C_{11}$ | $C_{12}$-$C_{23}$ | More than $C_{23}$ |
| 280 | 6.4 | 37.8 | 55.8 | 13.1 | 33.6 | 53.3 |
| 340 | 18.3 | 59.7 | 22.0 | 16.5 | 54.7 | 28.8 |
| 400 | 23.7 | 76.3 | 0.0 | 24.4 | 63.4 | 12.0 |

As can be seen in Table 3, when the mixture consisting of various plastics, woody hydrocarbons and waste oils was subjected to the cracking reaction, the catalyst of the present invention enabled good-quality light oil to be obtained in a high yield even at a temperature lower than 400° C. In addition, as the temperature was increased, the residue was decreased, the vapor-phase and liquid-phase products were increased, and the selectivity to the $C_{12}$-$C_{23}$ light oil fraction among these liquid-phase products was increased. Such results indicate that the catalyst prepared according to the method of the present invention greatly increased the yield of light oil.

The catalyst of the present invention will be effective in producing good-quality light oil from waste plastics, woody hydrocarbons, waste oils and the like and will also contribute to solving environmental problems While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A crystalline zeolite catalyst for recovering light oil, which has a three-dimensional network structure and a cubic crystal structure sharing oxygen atoms, includes a water molecule of crystallization, and comprises a mixture of manganese aluminosilicate ($Mn_2Al_4Si_5O_{18}$) and sodium manganese aluminosilicate ($Na_6MnAl_4Si_8O_{26}$) or a mixture of manganese aluminosilicate ($Mn_2Al_4Si_5O_{18}$) and hydrogen manganese aluminosilicate ($H_6MnAl_4Si_8O_{26}$).

* * * * *